United States Patent
Rusanovskyy et al.

(10) Patent No.: US 10,356,420 B2
(45) Date of Patent: Jul. 16, 2019

(54) VIDEO SIGNAL PROCESSING METHOD USING GRAPH BASED TRANSFORM AND DEVICE THEREFOR

(71) Applicant: LG ELECTRONICS INC., Seoul (KR)

(72) Inventors: Dmytro Rusanovskyy, San Jose, CA (US); Yung-Hsuan Chao, San Jose, CA (US)

(73) Assignee: LG Electronics Inc., Seoul (KR)

( * ) Notice: Subject to any disclaimer, the term of this patent is extended or adjusted under 35 U.S.C. 154(b) by 3 days.

(21) Appl. No.: 15/527,155

(22) PCT Filed: Nov. 11, 2015

(86) PCT No.: PCT/KR2015/012103
§ 371 (c)(1),
(2) Date: May 16, 2017

(87) PCT Pub. No.: WO2016/076624
PCT Pub. Date: May 19, 2016

(65) Prior Publication Data
US 2017/0359581 A1    Dec. 14, 2017

Related U.S. Application Data

(60) Provisional application No. 62/080,384, filed on Nov. 16, 2014.

(51) Int. Cl.
*H04N 19/14* (2014.01)
*H04N 19/18* (2014.01)
(Continued)

(52) U.S. Cl.
CPC ............. *H04N 19/14* (2014.11); *G06T 7/162* (2017.01); *H04N 19/119* (2014.11);
(Continued)

(58) Field of Classification Search
CPC ...... H04N 19/14; H04N 19/18; H04N 19/176; H04N 19/119; H04N 19/12; G06T 7/162; G06T 7/254
(Continued)

(56) References Cited

U.S. PATENT DOCUMENTS

| | | | |
|---|---|---|---|
| 2011/0229024 A1 | 9/2011 | El-Maraghi et al. | |
| 2013/0022288 A1* | 1/2013 | Sartor | G06T 5/002 382/266 |
| 2013/0272422 A1* | 10/2013 | Lee | H04N 19/00781 375/240.18 |

FOREIGN PATENT DOCUMENTS

| | | |
|---|---|---|
| JP | 2014007477 | 1/2014 |
| KR | 20110093532 | 8/2011 |
| KR | 20110135787 | 12/2011 |

OTHER PUBLICATIONS

Zhang, Cha, "Analyzing the Optimality of Predictive Transform Coding Using Graph-Based Models," Signal Processing Letters, IEEE, Nov. 27, 2012, 20(1):106-109.
(Continued)

*Primary Examiner* — Hee-Yong Kim
(74) *Attorney, Agent, or Firm* — Fish & Richardson P.C.

(57) ABSTRACT

Disclosed is a method for processing a video signal using graph-based transform and a device for the method. A method for processing a video signal using graph-based transform, including specifying a set of available graph configurations in order to process the video signal, extracting signal structure information from samples within a processing block of the image, configuring a graph for the samples within the processing block using the signal structure information, determining transform for the processing block using the graph, and transforming the samples within the processing block using the transform. The signal structure information may be defined as information about a
(Continued)

graph configuration which belongs to the set of specified graph configurations and which is applied to each of the samples within the processing block.

7 Claims, 12 Drawing Sheets

(51) Int. Cl.
    *G06T 7/162*     (2017.01)
    *G06T 7/254*     (2017.01)
    *H04N 19/176*     (2014.01)
    *H04N 19/119*     (2014.01)
    *H04N 19/12*     (2014.01)

(52) U.S. Cl.
    CPC ........... *H04N 19/12* (2014.11); *H04N 19/176* (2014.11); *H04N 19/18* (2014.11); *G06T 7/254* (2017.01)

(58) Field of Classification Search
    USPC .................................................. 375/240.18
    See application file for complete search history.

(56) References Cited

OTHER PUBLICATIONS

International Search Report in International Application No. PCT/KR2015/012103, dated Mar. 7, 2016, 11 pages.

\* cited by examiner

[FIG. 1]
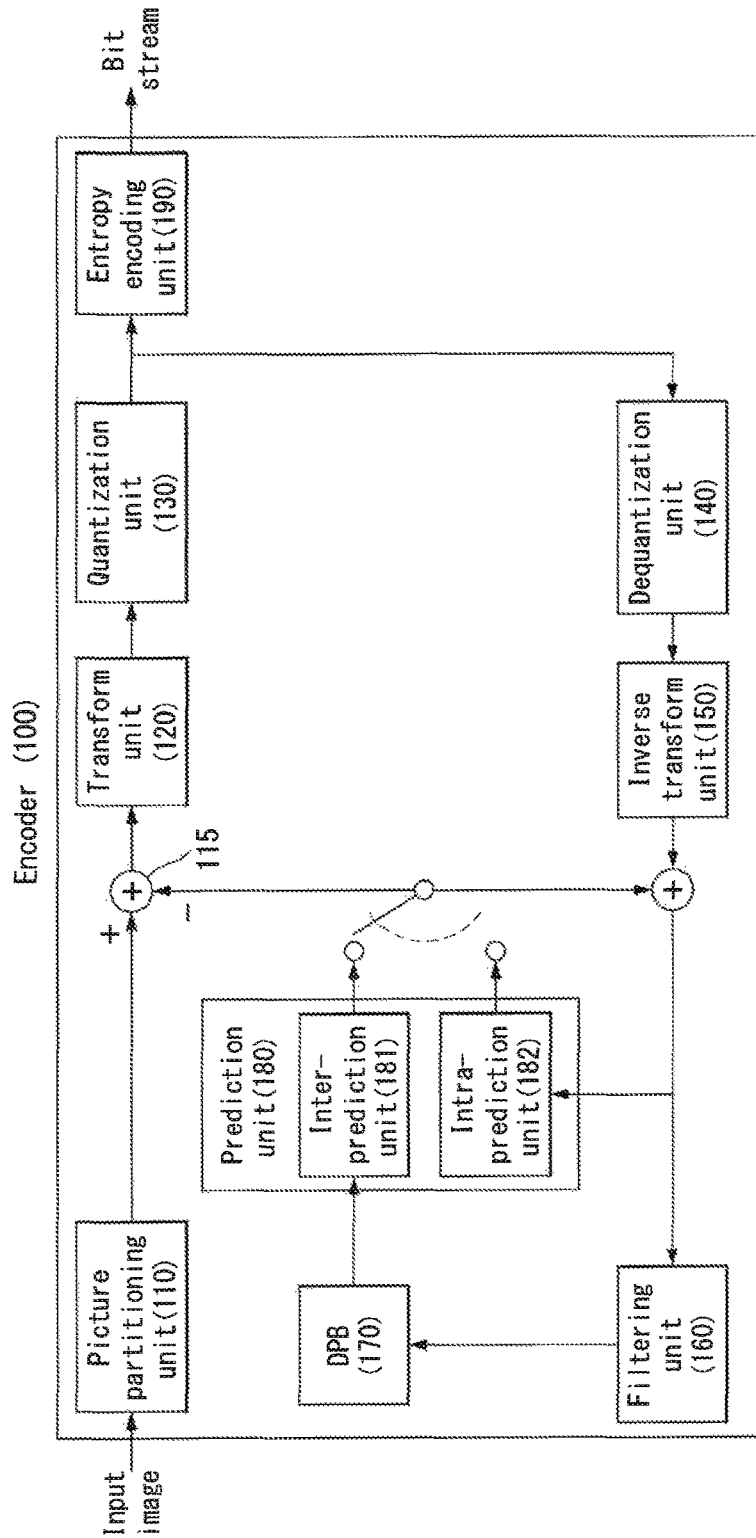

[FIG. 2]
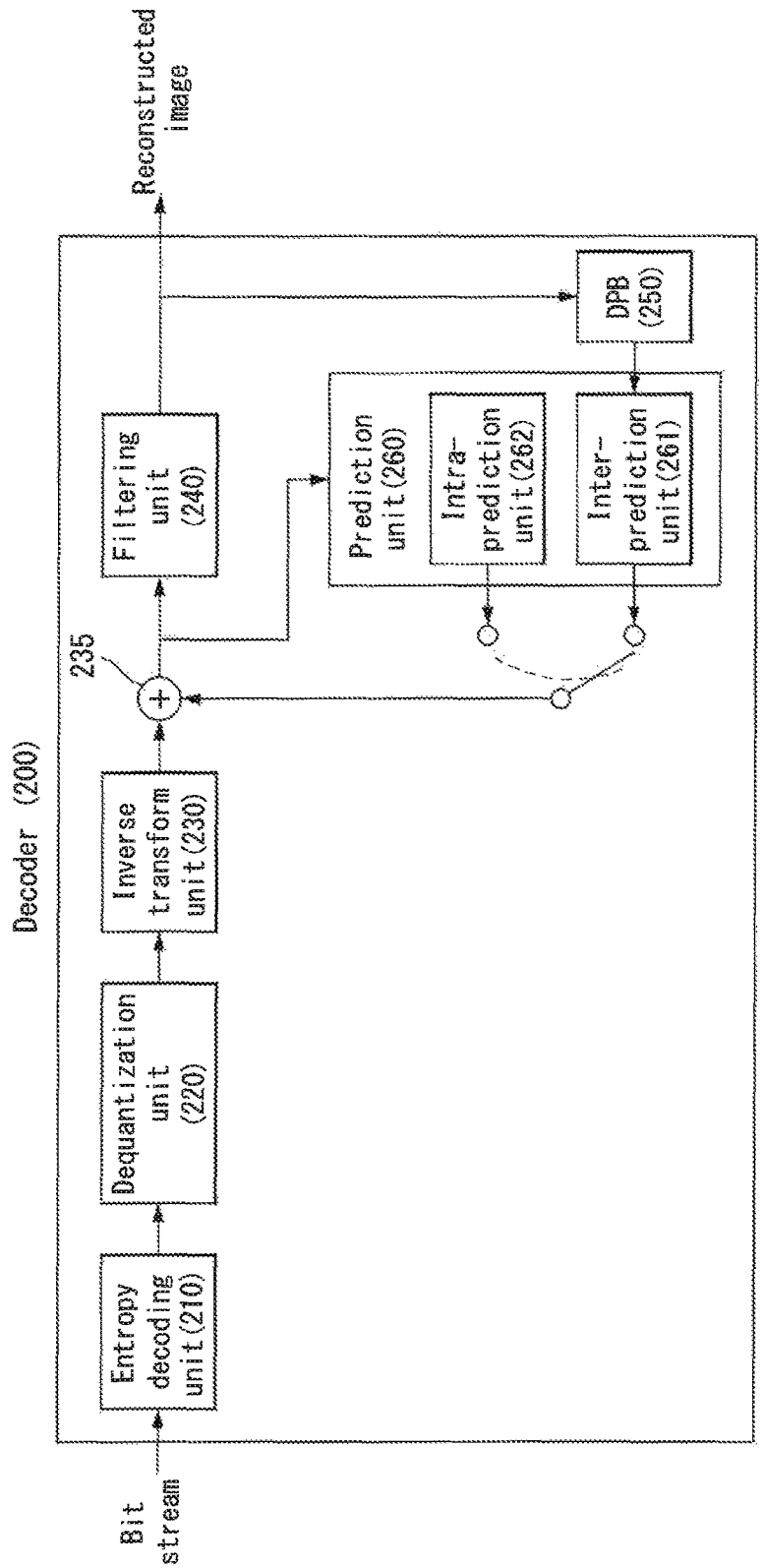

[FIG. 3]
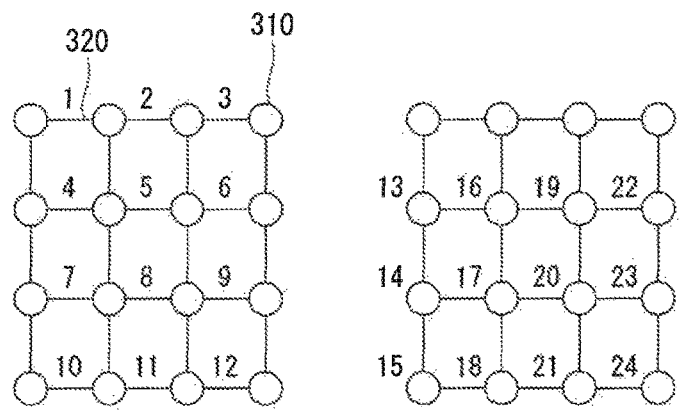
[FIG. 4]
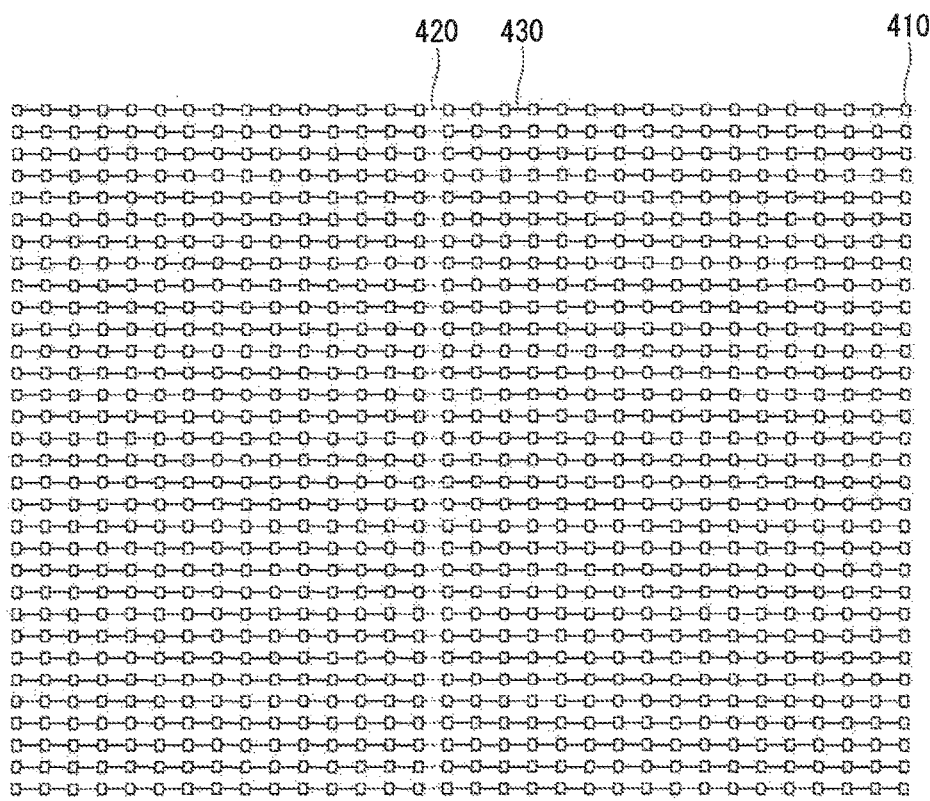

[FIG. 5]
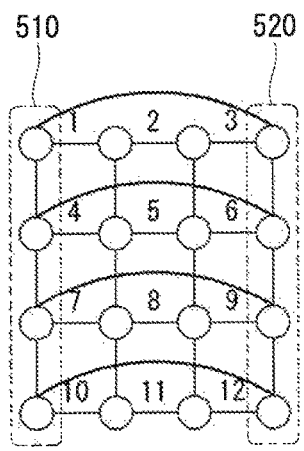
[FIG. 6]
$$D = \begin{bmatrix} 2 & 0 & 0 & 0 \\ 0 & 2 & 0 & 0 \\ 0 & 0 & 2 & 0 \\ 0 & 0 & 0 & 2 \end{bmatrix} \quad D = \begin{bmatrix} 1 & 0.1 & 0 & 0 \\ 0.1 & 1 & 1 & 0 \\ 0 & 1 & 1 & 0.1 \\ 0 & 0 & 0.1 & 1 \end{bmatrix}$$

[FIG. 7]
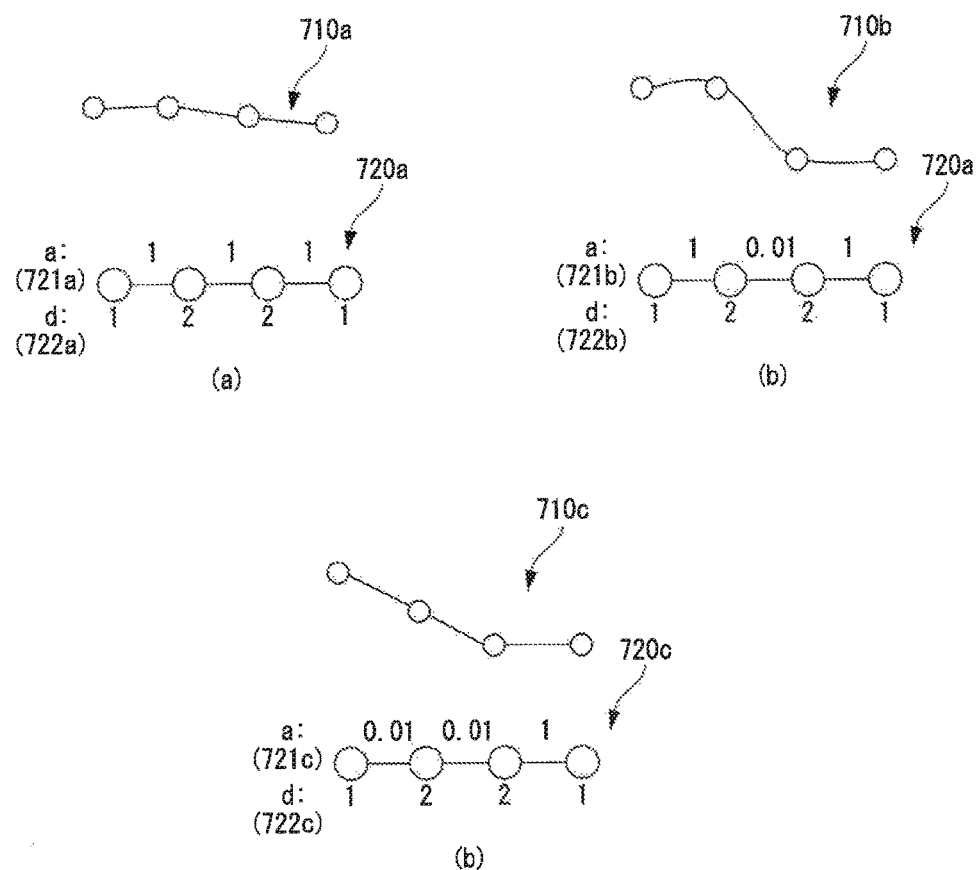

[FIG. 8]
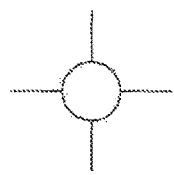
C = { d=4, a=(1, 1, 1, 1) }
(a)
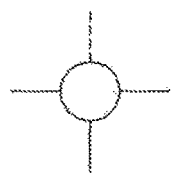
C= { d=4, a=(0.1,1,1,1) }
(b)
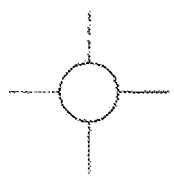
C= { d=4, a=(0.1,1,1,0.1) }
(c)
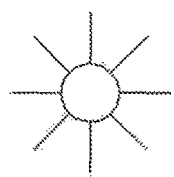
C= { d=8, a=(1,1,1,1,1,1,1,1) }
(d)
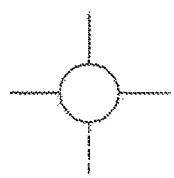
C= { d=4, a=(1,1,0.1,1) }
(e)
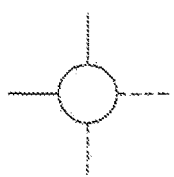
C= { d=4, a=(1,0.1,0.1,1) }
(f)

[FIG. 9]
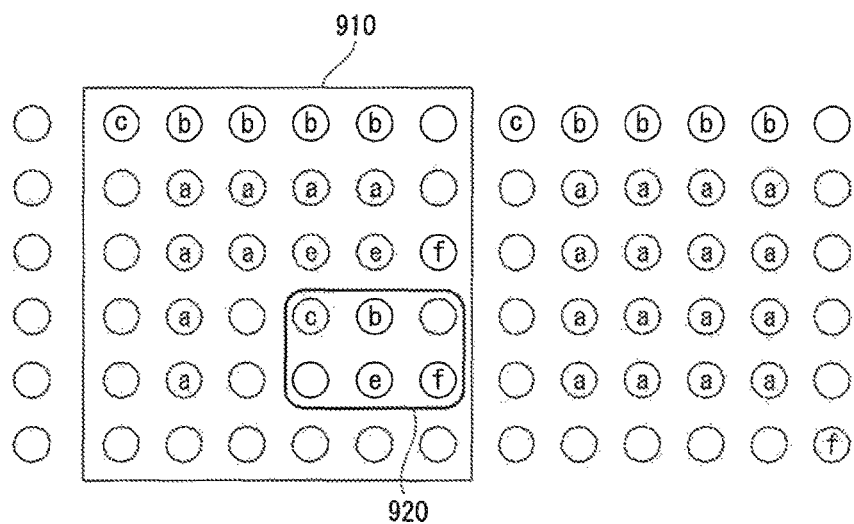
[FIG. 10]
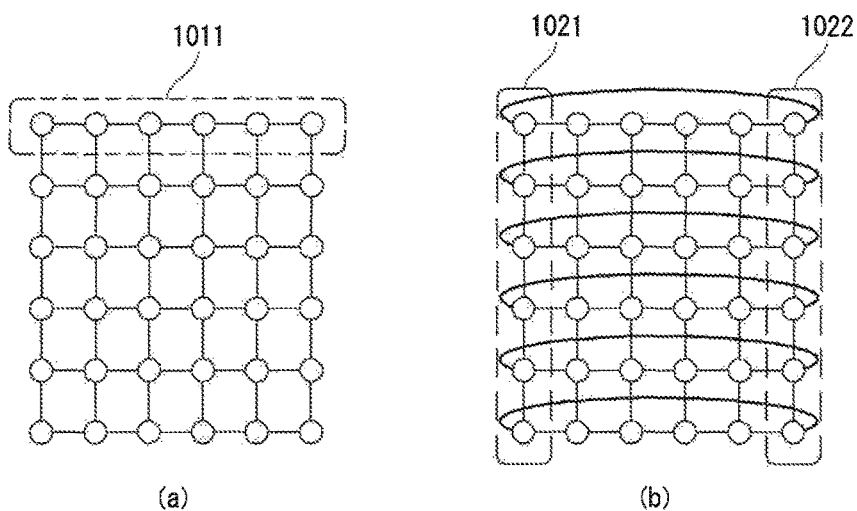
(a)  (b)

[FIG. 11]
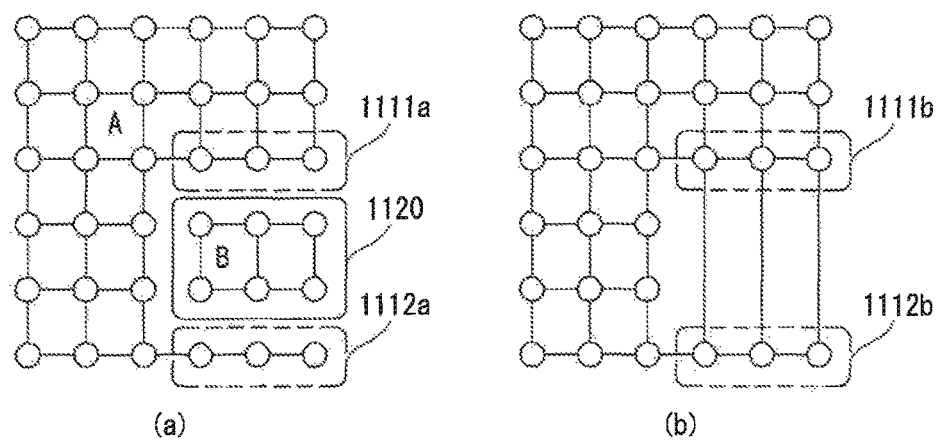
(a)　　　　　　　　　(b)
[FIG. 12]
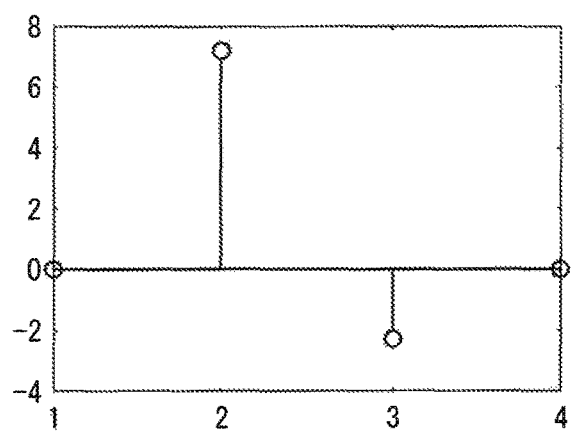

[FIG. 13]
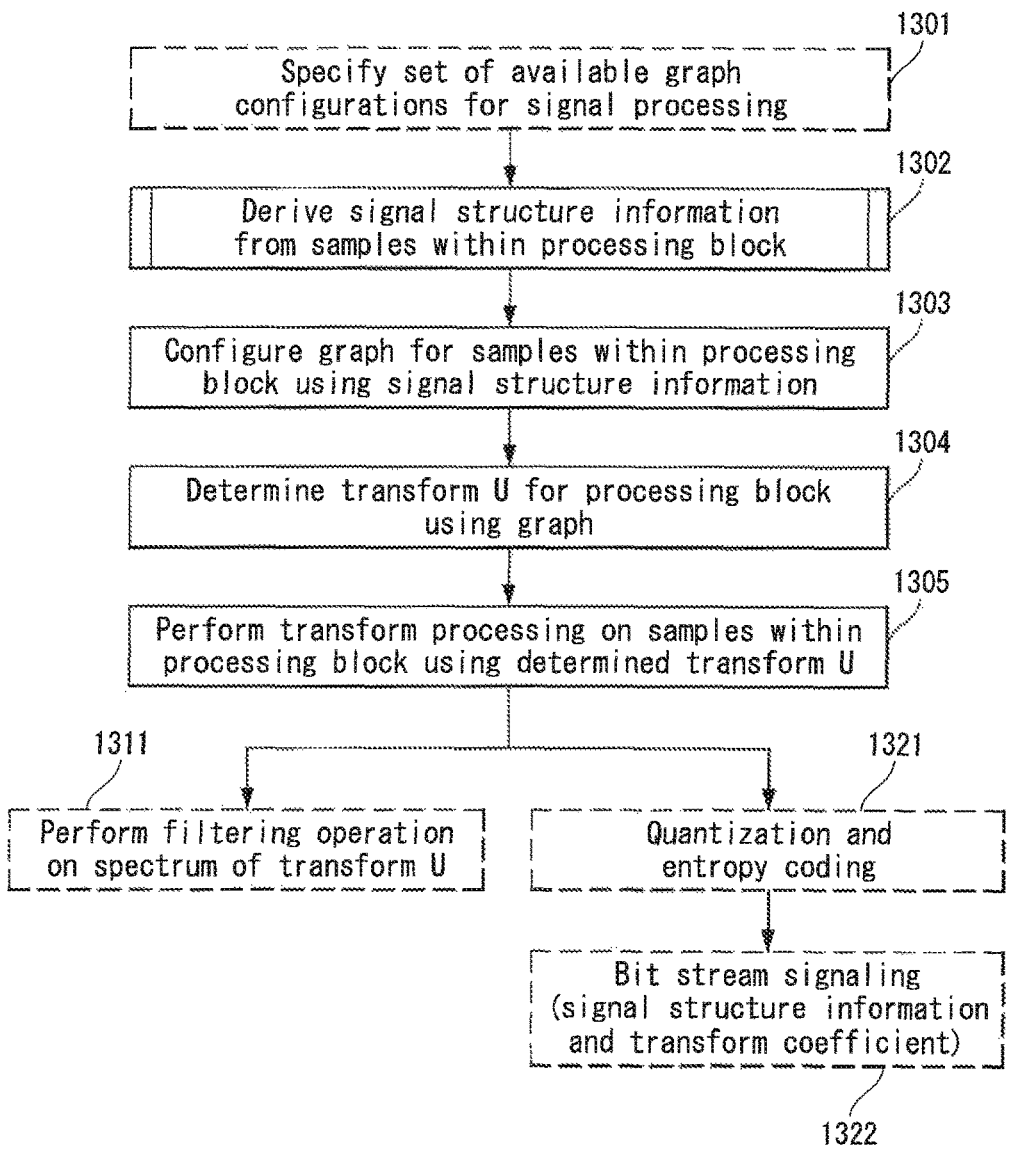
[FIG. 14]
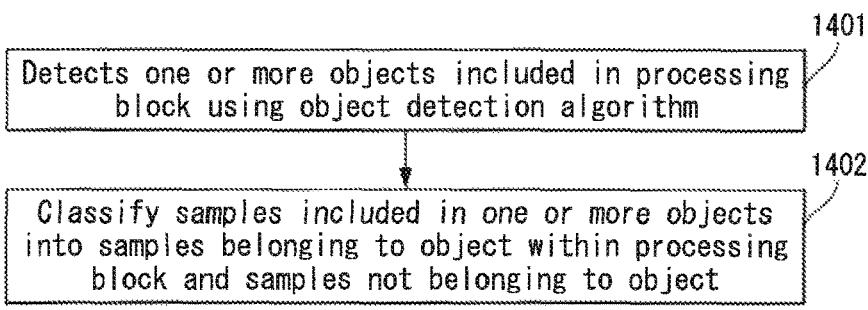

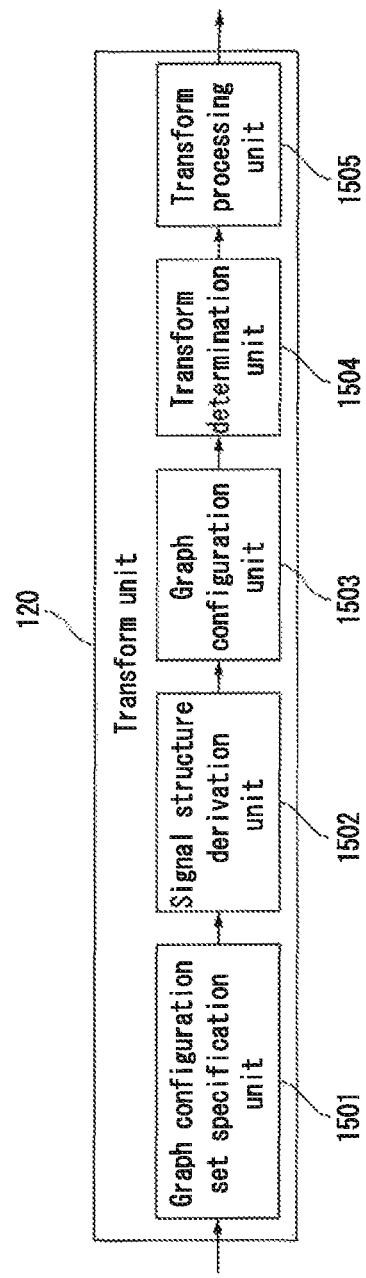
[FIG. 15]

[FIG. 16]
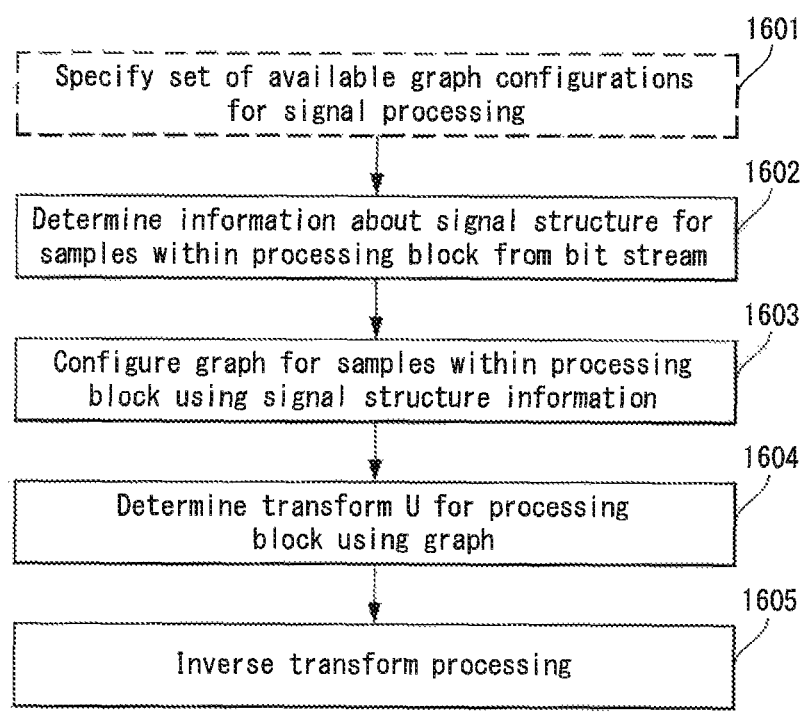

[FIG. 17]
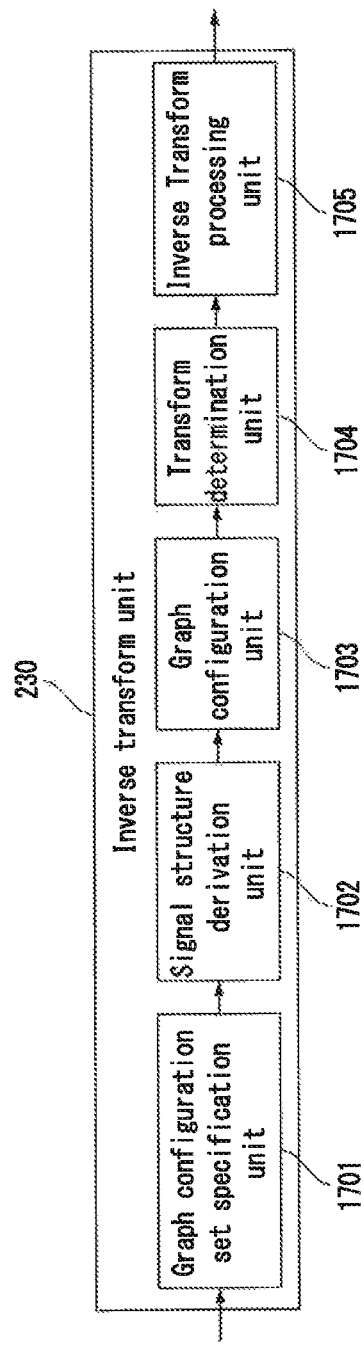

VIDEO SIGNAL PROCESSING METHOD USING GRAPH BASED TRANSFORM AND DEVICE THEREFOR

CROSS-REFERENCE TO RELATED APPLICATIONS

This application is the National Stage filing under 35 U.S.C. 371 of International Application No. PCT/KR2015/012103, filed on Nov. 11, 2015, which claims the benefit of U.S. Provisional Application No. 62/080,384, filed on Nov. 16, 2014, the contents of which are all hereby incorporated by reference herein in their entirety.

TECHNICAL FIELD

The present invention relates to a method for processing an image and/or a video signal and, more particularly, to a method for processing an image and/or a video signal using graph-based transform and a device supporting the same.

BACKGROUND ART

Compression encoding means a series of signal processing techniques for transmitting digitized information through a communication line or techniques for storing the information in a form suitable for a storage medium. The medium including a picture, an image and/or audio may be a target for compression encoding. In particular, a technique for performing compression encoding on a picture is referred to as "video image compression."

Next-generation video content is supposed to have the characteristics of high spatial resolution, a high frame rate and high dimensionality of scene representation. In order to process such content, a drastic increase of memory storage, a memory access rate and processing power may be required.

Accordingly, it is necessary to efficiently design a coding tool for processing next-generation video content.

DISCLOSURE

Technical Problem

An embodiment of the present invention proposes a method for configuring a compact signal structure description for a specific class of an image and/or a video signal and a method for deriving optimal graph-based transform for such a signal.

Furthermore, an embodiment of the present invention proposes a method for deriving graph-based transform using a signal structure description.

Furthermore, an embodiment of the present invention proposes a method for processing an image and/or a video signal using derived graph-based transform.

Objects of the present invention are not limited to the aforementioned technical objects, and those skilled in the art may understand other technical objects not described above from the following description.

Technical Solution

In an aspect of the present invention, a method for processing a video signal using graph-based transform, including specifying a set of available graph configurations in order to process the video signal, extracting signal structure information from samples within a processing block of the image, configuring a graph for the samples within the processing block using the signal structure information, determining transform for the processing block using the graph, and transforming the samples within the processing block using the transform. The signal structure information may be defined as information about a graph configuration which belongs to the set of specified graph configurations and which is applied to each of the samples within the processing block.

In another aspect of the present invention, a method for processing a video signal using graph-based transform, including specifying a set of available graph configurations in order to process the video signal, determining signal structure information from the bit stream of the video signal, configuring a graph for samples within a processing block of the video signal using the signal structure information, determining transform for the processing block using the graph, and inverse transforming a transform coefficient determined from the bit stream. The signal structure information may be defined as information about a graph configuration which belongs to the set of specified graph configurations and which is applied to each of the samples within the processing block.

The graph configuration may be determined depending on whether the sample belongs to a detected object within the processing block or not, or depending on whether the sample is located at the border of the object or not.

The graph configuration may be determined so that a sample located at the border of the processing block has a smaller number of edges than other samples.

The graph configuration may be determined so that a sample located at the vertical border of the processing block has a circular edge along with a sample located at another vertical border on the side opposite the processing block.

The graph configuration may be determined so that a sample adjacent to an object does not have an edge along with a sample adjacent to the other side of the object.

The graph configuration may be determined so that a sample adjacent to an object has an edge along with a sample adjacent to the other side of the object.

The graph configuration may include information about an association between a sample and a node within the processing block, information about a number of edges available in the node, and weight for all of edges available in the node.

The samples within the processing block may be classified into a plurality of signal classes based on the signal structure information. An offset value may be independently applied to the degree matrix of the graph for each of the plurality of signal classes.

Advantageous Effects

In accordance with an embodiment of the present invention, the utilization of graph-based transform for the processing and encoding/decoding of an image/video signal can be improved.

Furthermore, in accordance with an embodiment of the present invention, not only complexity related to the signaling of a signal structure description required to derive graph-based transform, but bit overhead can be reduced.

Furthermore, in accordance with an embodiment of the present invention, compression efficiency of a coding system using a graph-based transform or approach method can be improved.

Furthermore, in accordance with an embodiment of the present invention, a system using a graph-based transform or approach method can be improved, and processing efficiency, such as filtering or denoising, can be improved.

Advantages of the present invention are not limited to the aforementioned advantages, and those skilled in the art will understand other technical advantages not described above from the description below.

DESCRIPTION OF DRAWINGS

The accompanying drawings, which are included herein as a part of the description for help understanding the present invention, provide embodiments of the present invention, and describe the technical features of the present invention with the description below.

FIG. 1 is illustrates a schematic block diagram of an encoder in which the encoding of a video signal is performed, which is an embodiment to which the present invention is applied.

FIG. 2 illustrates a schematic block diagram of a decoder in which the decoding of a video signal is performed, which is an embodiment to which the present invention is applied.

FIGS. 3 to 5 are diagrams for illustrating a method for processing a graph-based video signal.

FIG. 4 is a diagram for illustrating a method for processing a graph-based signal.

FIG. 6 is a diagram illustrating a graph for a 2-D video signal and a degree matrix D and an adjacent matrix A according to the graph.

FIG. 7 is a diagram for illustrating a method for classifying the class of a video signal based on a variation of the video signal according to an embodiment of the present invention.

FIG. 8 illustrates graph structures and graph parameter configurations according to embodiments of the present invention.

FIG. 9 illustrates a method for defining a graph configuration for the processing of a video signal according to an embodiment of the present invention.

FIGS. 10 and 11 illustrate graph configurations for the block of a video signal according to embodiments of the present invention.

FIG. 12 is a diagram for illustrating a method for deriving transform depending on a variation pattern of a video signal according to an embodiment of the present invention.

FIGS. 13 and 14 are diagrams illustrating a method for processing a video signal using graph-based transform according to an embodiment of the present invention.

FIG. 15 is a detailed diagram illustrating a transform unit which performs graph-based transform according to an embodiment of the present invention.

FIG. 16 is a diagram illustrating a method for processing a video signal using graph-based transform according to an embodiment of the present invention.

FIG. 17 is a detailed diagram illustrating an inverse transform unit which performs graph-based transform according to an embodiment of the present invention.

MODE FOR INVENTION

Hereinafter, embodiments of the present invention will be described by reference to the accompanying drawings. The description that will be described below with the accompanying drawings is to describe exemplary embodiments of the present invention, and is not intended to describe the only embodiment in which the present invention may be implemented. The description below includes particular details in order to provide perfect understanding of the present invention. However, it is understood that the present invention may be embodied without the particular details to those skilled in the art.

In some cases, in order to prevent the technical concept of the present invention from being unclear, structures or devices which are publicly known may be omitted, or may be depicted as a block diagram centering on the core functions of the structures or the devices.

Further, although general terms widely used currently are selected as the terms in the present invention as much as possible, a term that is arbitrarily selected by the applicant is used in a specific case. Since the meaning of the term will be clearly described in the corresponding part of the description in such a case, it is understood that the present invention will not be simply interpreted by the terms only used in the description of the present invention, but the meaning of the terms should be figured out.

Specific terminologies used in the description below may be provided to help the understanding of the present invention. Furthermore, the specific terminology may be modified into other forms within the scope of the technical concept of the present invention. For example, a signal, data, a sample, a picture, a frame, a block, etc may be properly replaced and interpreted in each coding process.

In the following specification, a "processing unit" means a unit in which an encoding/decoding processing process such as prediction, transform and/or quantization is performed. For convenience of description, the processing unit may be hereinafter called a "processing block" or "block."

The processing unit may be interpreted as a meaning including a unit for a luma component and a unit for a chroma component. For example, the processing unit may correspond to a coding tree unit (CTU), a coding unit (CU), a prediction unit (PU) or a transform unit (TU).

Furthermore, the processing unit may be interpreted as a unit for a luma component or a unit for a chroma component. For example, the processing unit may correspond to a coding tree block (CTB), a coding block (CB), a prediction block (PU) or a transform block (TB) for a luma component. Alternatively, the processing unit may correspond to a coding tree block (CTB), a coding block (CB), a prediction block (PU) or a transform block (TB) for a chroma component. Furthermore, the present invention is not limited to the examples, and the processing unit may also be interpreted as a meaning including a unit for a luma component and a unit for a chroma component.

Furthermore, the processing unit is not necessarily limited to a square block, but may include a polygonal form having three or more vertexes.

Furthermore, in the following specification, a pixel of an image/video/picture is collective referred to as a "sample." Furthermore, to use a sample may mean to use a pixel value or a picture element value.

FIG. 1 is illustrates a schematic block diagram of an encoder in which the encoding of a video signal is performed, which is an embodiment to which the present invention is applied.

Referring to FIG. 1, an encoder 100 may include a picture partitioning unit 110, a subtract unit 115, a transform unit 120, a quantization unit 130, a dequantization unit 140, an inverse transform unit 150, a filtering unit 160, a decoded picture buffer (DPB) 170, a prediction unit 180 and an entropy encoding unit 190. And the prediction unit 180 may include an inter-prediction unit 181 and an intra-prediction unit 182.

The picture partitioning unit 110 partitions an input video signal (or a picture or frame), input to the encoder 100, into one or more processing units.

The subtract unit 115 generates a residual signal by subtracting the prediction signal that is outputted from the prediction unit 180 (i.e., the inter-prediction unit 181 or the intra-prediction unit 182) from the input video signal. The generated residual signal is transmitted to the transform unit 120.

The transform unit 120 generates a transform coefficient by applying a transform technique to the residual signal.

In particular, in an embodiment of the present invention, the transform unit 120 may derive graph-based transform proposed by the present invention and perform transform based on the derived graph-based transform. The transform unit 120 is described in detail later.

The quantization unit 130 quantizes the transform coefficient and transmits it to the entropy encoding unit 190, and the entropy encoding unit 190 performs an entropy coding operation of the quantized signal and outputs it as a bit stream.

The quantized signal that is outputted from the quantization unit 130 may be used for generating a prediction signal. For example, by applying dequatization and inverse transformation to the quantized signal through the dequantization unit 140 and the inverse transform unit 150, the residual signal may be reconstructed. By adding the reconstructed residual signal to the prediction signal that is outputted from the inter-prediction unit 181 or the intra-prediction unit 182, a reconstructed signal may be generated.

During such a compression process, adjacent blocks are quantized by different quantization parameters, and accordingly, an artifact in which block boundaries are shown may occur. Such a phenomenon is referred to as a blocking artifact, which is one of important factors for evaluating image quality. In order to decrease such an artifact, a filtering process may be performed. Through such a filtering process, the blocking artifact is removed and an error for the current picture is decreased at the same time, thereby improving image quality.

The filtering unit 160 applies filtering to the reconstructed signal, and outputs it through a playback device or transmits it to the decoded picture buffer 170. The filtered signal transmitted to the decoded picture buffer 170 may be used as a reference picture in the inter-prediction unit 181. As described above, the encoding rate as well as the image quality may be improved using the filtered picture as a reference picture in an inter-picture prediction mode.

The decoded picture buffer 170 may store the filtered picture in order to use it as a reference picture in the inter-prediction unit 181.

The inter-prediction unit 181 performs a temporal prediction and/or a spatial prediction by referencing the reconstructed picture in order to remove a temporal redundancy and/or a spatial redundancy. Here, since the reference picture used for performing a prediction is a transformed signal that goes through the quantization or the dequantization by a unit of block when being encoded/decoded previously, there may exist blocking artifact or ringing artifact.

Accordingly, in order to solve the performance degradation owing to the discontinuity of such a signal or the quantization, by applying a low pass filter to the inter-prediction unit 181, the signals between pixels may be interpolated by a unit of sub-pixel. Herein, the sub-pixel means a virtual pixel that is generated by applying an interpolation filter, and an integer pixel means an actual pixel that is existed in the reconstructed picture. As a method of interpolation, a linear interpolation, a bi-linear interpolation, a wiener filter, and the like may be applied.

The interpolation filter may be applied to the reconstructed picture, and may improve the accuracy of prediction. For example, the inter-prediction unit 181 may perform prediction by generating an interpolation pixel by applying the interpolation filter to the integer pixel, and by using the interpolated block that includes interpolated pixels as a prediction block.

The intra-prediction unit 182 predicts the current block by referring to the samples adjacent the block that is to be encoded currently. The intra-prediction unit 182 may perform the following procedure in order to perform the intra-prediction. First, the intra-prediction unit 182 may prepare a reference sample that is required for generating a prediction signal. Furthermore, the intra-prediction unit 182 may generate a prediction signal by using the reference sample prepared. Thereafter, the intra-prediction unit 182 may encode the prediction mode. In this case, the reference sample may be prepared through reference sample padding and/or reference sample filtering. Since the reference sample goes through the prediction and the reconstruction process, there may be a quantization error. Accordingly, in order to decrease such an error, the reference sample filtering process may be performed for each prediction mode that is used for the intra-prediction.

The prediction signal that is generated through the inter-prediction unit 181 or the intra-prediction unit 182 may be used for generating the reconstructed signal or the residual signal.

FIG. 2 illustrates a schematic block diagram of a decoder in which the decoding of a video signal is performed, which is an embodiment to which the present invention is applied.

Referring to FIG. 2, a decoder 200 may include an entropy decoding unit 210, a dequantization unit 220, an inverse transform unit 230, an add unit 235, a filtering unit 240, a decoded picture buffer (DPB) 250 and a prediction unit 260. And the prediction unit 260 may include an inter-prediction unit 261 and an intra-prediction unit 262.

Furthermore, the reconstructed video signal outputted through the decoder 200 may be played through a play-back device.

The decoder 200 receives the signal (i.e., bit stream) outputted from the encoder 100 shown in FIG. 1, and the entropy decoding unit 210 performs an entropy decoding operation of the received signal.

The dequantization unit 220 acquires a transform coefficient from the entropy-decoded signal using quantization step size information.

The inverse transform unit 230 acquires a residual signal by inverse-transforming the transform coefficient.

In particular, in an embodiment of the present invention, the inverse transform unit 230 may derive graph-based transform proposed by the present invention and perform inverse transform based on the derived graph-based transform. The inverse transform unit 230 is described in detail later.

The add unit 235 generates a reconstructed signal by adding the acquired residual signal to the prediction signal that is outputted from the prediction unit 260 (i.e., the inter-prediction unit 261 or the intra-prediction unit 262).

The filtering unit 240 applies filtering to the reconstructed signal, and outputs it through a play-back device or transmits it to the decoded picture buffer 250. The filtered signal transmitted to the decoded picture buffer 250 may be used as a reference picture in the inter-prediction unit 261.

In this specification, the embodiments described in the filtering unit 160, the inter-prediction unit 181 and the intra-prediction unit 182 of the encoder 100 may also be applied to the filtering unit 240, the inter-prediction unit 261 and the intra-prediction unit 262 of the decoder, respectively, in the same way.

Today, digital signal processing is closely related to the application of transform-based processing. One of the most noticeable types of transform is discrete cosine transform (DCT). DCT is widely applied to a signal compression systems, such as a sliding window 3D DCT algorithm (SW-3DDCT) for video denoising, MPEG audio layer-3 (MP3) for audio in addition to image and video processing technologies such as block-matching and 3D filtering (BM3D) for image denoising, joint photographic experts group (JPEG) for an image, most of video coding systems (H.264/advanced video coding (AVC), and H.265/high efficiency video coding (HEVC).

DCT has been widely applied due to the fact that highly correlated signals have a correlation coefficient between adjacent samples which is close to 1 and are first very approximate to Karhunen-Loeve transform (KLT) for signals modeled by Markov processing.

A basis function of KLT is calculated as the eigenvector of the covariance matrix of a signal and a mean square error caused due to the truncation of the basis function is minimized. Accordingly, the KLT is optimal signal-adaptive transform in terms of energy compression.

As a result, the basis vectors of DCT are values most proximate to the eigenvector of the covariance matrix of AR(1) processing having a correlation coefficient r=1. In the case of a high correlation signal such as common image and video, such a covariance matrix is common. Accordingly, DCT is close to an optimum in decorrelation and energy compression characteristics.

However, with respect to a signal that cannot be described by the AR(1) processing having r=1, KLT (i.e., an eigenvector produced from the covariance matrix of the signal) is different from the basis function of DCT. Accordingly, DCT is not optimal transform and thus more efficient transform may be designed from a viewpoint of the decorrelation and energy compression characteristics.

For a signal that cannot be described by the AR(1) processing having r=1, an existing approach method for deriving optimal KLT shows the statistical characteristic of a 2-D signal (i.e., the structure of a signal) through a separable covariance matrix, and a KLT basis is calculated as an eigenvector. Such an approach method typically limits the sample representation (i.e., a sampling rate) of a processing image and limits a statistical dependency present within a 2-D image to horizontal and vertical dependencies.

In order to overcome such limits, a theory for the graph representation of a signal has been developed.

A graph is a set of points (i.e., nodes or vertexes) connected by lines (i.e., edges). In the graph representation of such a signal, a sample of a multi-dimensional signal forms a node of the graph. In other words, one or more pixels may be associated with a node (or vertex) of the graph, and the value of a pixel may corresponds to the value of a node (or vertex) of the graph. An edge of the graph represents a statistical dependency between samples of a signal. In this case, positive weight may represent strength. For example, each node (or vertex) of the graph may be connected to all of other nodes (or vertexes). Weight of 0 may be allocated to an edge that connects nodes (or vertexes) that are not associated with each other or that are weakly associated with each other. However, for the simplicity of representation, an edge having weight of 0 may be fully removed.

Edges that connect a graph node (or vertex) may be previously set depending on a signal characteristic. For example, nodes (or vertexes) may be deployed on a 1-D array with respect to an audio signal, may be deployed on a 2-D array with respect to an image (i.e., a still image), and may be deployed on a 3-D array a video frame (i.e., a moving image). In the case of the 3-D array, a time axis may be a third dimension.

FIG. 3 is a diagram for illustrating a method for processing a graph-based video signal.

FIG. 3 illustrates a graph configured for an image block of a 4×4 size.

In FIG. 3, a circle 310 denotes a node related to an image sample, and a line 320 between the nodes denotes a statistical dependency between graph edges (or links) or samples. In FIG. 3, 1 to 12 edges denote a horizontal dependency, and 13 to 24 edges denote a vertical dependency.

A node of the graph may be connected to another node of the graph, and strength of statistical similarity is represented as positive weight. If a statistical dependency is not present between two signal samples or a statistical dependency between two signal samples can be neglected during a signal processing process, an edge that connects two nodes showing such sample is commonly represented as small weight close to 0.

FIG. 4 is a diagram for illustrating a method for processing a graph-based video signal.

FIG. 4 shows a graph configured for an image block of a 16×16 size.

An image sample is related to a graph node (a small rectangle) 410, and a horizontal dependency between image samples is represented as graph edges 420 and 430.

The type (i.e., solid line or dotted line) of edge indicates the level of a statistical dependency between nodes. For example, a solid line 430 indicates a strong dependency (e.g., weight w=1), and a dotted line 420 indicates a weak dependency (i.e., weight w is close to 0, for example, w=0.001).

The graph illustrated in FIG. 4 shows an example in which a block of a 16×16 size is partitioned into two blocks of an 8×16 size and a dependency is not present between samples located at a block partitioning border or the dependency is intentionally neglected.

That is, a statistical dependency between samples located at a partitioning border is not present (In this case, the dotted line 420 has edge weight of 0), or a statistical dependency between samples located at a partitioning border may not be intentionally used during a process of processing a signal (e.g., two blocks of an 8×16 size is independently processed).

In general, each node of a graph is related to a corresponding node, and thus one or more other nodes adjacent to a sample that is being processed may be connected and may also be connected to one or more other nodes located in a remote distance spatially or temporally.

The number of possible connections from each node to another node specifies the complexity of a graph depending on a signal design (i.e., assumption on a signal) or an actual dependency present in a signal.

FIG. 5 is a diagram for illustrating a method for processing a graph-based video signal.

FIG. 5 illustrates a graph configured to an image block of a 4×4 size having a circular dependency in a horizontal direction.

In FIG. 5, nodes related to samples located at the vertical border of a block are connected to samples located at the border of the block on the opposite side by a graph edge. It may be interpreted that such an edge has a circular dependency of data in the horizontal direction. That is, a horizontal dependency is present between samples 510 located at a left/right block border and samples 520 located at a right/left block border.

If a graph G includes N nodes (or vertexes) {n_i} (i=0, . . . , N−1), the graph G is mathematically indicated through a diagonal degree matrix "D" and an adjacent matrix "A." That is, the diagonal degree matrix "D" includes information about the degree of each node (or vertex) of the graph, and the adjacent matrix "A" indicates a connection edge with an adjacent node (or vertex) as weight.

The diagonal degree matrix D of an N×N size may include an element (or entry) d_i,j (i=j) indicative of the number of available edges in a node n_i.

Furthermore, the diagonal degree matrix D of an N×N size may include an element (or entry) d_i,i indicative of the sum of weight of edges which is connected from a node n_i to the node n_j (i≠j), and d_i,j (i≠j) may have a value 0. That is, only a diagonal element (or entry) may have a value.

Hereinafter, in the description of the present invention, an element (or entry) of the diagonal degree matrix D indicates the number of available edges for convenience of description, but the present invention is not limited thereto.

An adjacent matrix A of the graph G including N nodes has an N×N size. A non-diagonal entry a_i,j (i≠j) of the adjacent matrix A is the number of edges from a node i to a node j (or weight of an edge), and the diagonal entry a_i,j (i=j) of the adjacent matrix A is one or more edges (i.e., a self-loop) from the node i to itself. If a self-loop is not present, a_i,j (i=j) may have a value 0.

FIG. 6 is a diagram illustrating a graph for a 2-D video signal and a degree matrix D and an adjacent matrix A according to the graph.

Referring to FIG. 6, the graph includes a total of four nodes 0, 1, 2, and 3.

Furthermore, for each node, the node 0 may be connected to the node 1 and the node 3, the node 1 may be connected to the node 0 and the node 2, the node 2 may be connected to the node 1 and the node 3, and the node 3 may be connected to the node 2 and the node 0. Accordingly, the number of all of edges is 2. Accordingly, the entry d_i,j (i=j) of the diagonal degree matrix D is all 2.

The value of entries a_0,1 and a_1,0 is 0.1 because edge weight between the node 0 and the node 1 is 0.1. The value of entries a_1,2 and a_2,1 is 1 because edge weight between the node 1 and the node 2 is 1. The value of entries a_2,3 and a_3,2 is 0.1 because edge weight between the node 2 and the node 3 is 0.1.

Furthermore, the values of all of the entries a_0,0, a_1,1, a_2,2, and a_3,3 is 1 because weight of an edge indicative of a connection to itself of each node is all 1.

A Laplacian matrix "L" is a complete representation of the graph, and is calculated from the degree matrix D and the adjacent matrix A as in Equation 1 below.

$$L = D - A \quad \text{[Equation 1]}$$

The Laplacian matrix L provides a sufficient description of the graph for deriving optimal signal orthogonal transform "U." That is, transform (kernel) U may be derived as in Equation 2 through an eigen-decomposition process.

$$L = UEU^t = \sum_{i=1}^{N} \lambda_i u_i u_i^t \quad \text{[Equation 2]}$$

In Equation 2, a diagonal matrix E includes a non-negative eigenvalue "λ_i", and transform (kernel) U (i.e., an eigenmatrix) includes a corresponding eigenvector "u_i."

The eigenmatrix U may provide graph-based Fourier transform specified for a corresponding image/video signal. For example, the eigenmatrix U that satisfies Equation 2 may mean a graph-based transform kernel.

As a result, a graph-based representation describes a processing dependency because it provides a structured description of dependency present in a signal that is being processed or specifies prior knowledge for a dependency that is assumed to be used during signal processing. That is, a dependency between samples that are used during signal processing may be specified based on a graph.

In order to accurately model a signal, a graph parameter, such as the number of edges per node (i.e., the entry of the degree matrix D) or strength of a graph edge (i.e., the entry of an adjacent matrix A) needs to be suitable for a signal that is being processed or the class (or type) of a signal.

Accordingly, a method for configuring a graph description according to the class of a given signal and a compact representation method are now open issues, and the present invention proposes a method for the open issues.

Graph-based transform provides a technology for describing the statistical characteristics of a signal, such as the structure of a signal, using a limited number of graph parameters. Optimal transform derived from a graph may be used in various signal processing applications, such as signal filtering and compression. In a typical case of signal compression, both the encoder and decoder of a signal need to have specific information so that graph transform can be configured. Therefore, a method for signaling a compact representation of a graph parameter and/or a compact representation of a graph parameter from the encoder to the decoder is important in terms of the use of graph-based transform.

As illustrated in FIG. 3, in order to configure a graph for a block of N×N image samples, a relation between inter-sample dependencies and a relation between an image sample and a graph node need to be established as weight of a graph edge.

A description required to configure a graph for a block of N×N image samples includes N^2 entries (i.e., the number of graph edges per node) of a degree matrix D and the entry of an adjacent matrix A. The number of entries is determined by a dependency established between nodes.

When a graph for an image block of an N×N size is configured, if samples within the block are limited to horizontal and vertical dependencies (i.e., four dependencies per pixel), the number of graph edges is equal to 2N(N−1) as in the example of FIG. 3. That is, in this case, the number of entries of the adjacent matrix A is equal to 2N(N−1).

In a common case, weight of a graph edge is limited to a range of 0 to 1 in order to incorporate a statistical dependency present within a signal and an actual value of weight of the graph edge cannot be previously known. Accordingly, a representation of a floating point for a parameter may be required.

A graph description for an image block of N×N samples includes about 3N^2 parameters. For example, the graph description may include N^2 parameters for the entry of the degree matrix D and about 2N^2 (e.g., 2N (N−1)) parameters for the entry of the adjacent matrix A.

In the class (i.e., type) of a specific signal and/or application, the parameters of the degree matrix D may be previously fixed. Accuracy in an edge weight representation may be controlled so that it does not affect performance of transform U derived from a graph description and parameters.

For example, in accordance with a depth map compression algorithm using graph-based transform, the entry of the degree matrix D has a fixed value for all of the samples of a picture that is being coded, each node has a maximum of four edges (i.e., two horizontal dependencies and two vertical dependencies), and a maximum number of entries and edges of the degree matrix D has been previously known.

The entry value of the adjacent matrix A is derived by processing an image coded by an edge detection algorithm (i.e., if an edge is present, edge weight is 1, and if an edge is not present, edge weight is 0) and is used to derive optimal transform. A binary map for an inter-sample correlation is coded using a lossless coding method and signaled to the decoder. The decoder derives optimal transform from the entry of the adjacent matrix A derived from a decoded binary map and the previously known degree matrix D.

The number of parameters that need to be signaled in order to describe a graph despite of a limit imposed to a graph, and about 1 parameter per pixel (i.e., sample) is required. A solution for such a graph description may be practical for the class (i.e., type) of a specific signal, but may not be applied to a common image.

Accordingly, an embodiment of the present invention proposes a method for configuring a compact graph structure description for the class (i.e., type) of a specific image and/or video signal and a method for driving optimal transform for such a signal.

In the description of the present invention, four major parts are described below.

1) The Classification of a Local Pattern within a Signal Each Graph Structure

An embodiment of the present invention proposes a method for classifying a local signal variation pattern as a specific number of types and establishing an association with the parameters of a graph.

A signal variation may be modeled by an analytical function (e.g., gradient) and may be classified as a pattern type.

FIG. 7 is a diagram for illustrating a method for classifying the class of a video signal based on a variation of the video signal according to an embodiment of the present invention.

FIG. 7 illustrates brief representations 710a, 710b and 710c of a one-dimensional (1-D) signal. Furthermore, FIG. 7 illustrates graphs (i.e., nodes and edges) 720a, 720b and 720c configured to the corresponding signal and the parameters of the corresponding graphs 720a, 720b and 720c, that is, the degree of nodes (i.e., the entries of a matrix D) 722a, 722b and 722c and weights of the edges (i.e., the entries of a matrix A) 721a, 721b and 721c.

FIG. 7(a) shows the pattern of a signal having a high correlation between adjacent samples. That is, a variation of the magnitude of a sample illustrates the fragment of a low signal (i.e., a smooth fragment).

FIG. 7(b) shows the pattern of a signal having a high spatial anti-correlation between adjacent samples. That is, FIG. 7(b) shows the fragment of a signal having a high local variation (e.g., an edge present within a signal).

FIG. 7(c) shows the pattern of a signal having a continuous variation between signal samples that may be modeled by a linear relationship. That is, FIG. 7(c) shows the fragment of a signal having a characteristic of a linear-modeled signal variation between samples S(1) to S(3).

In the examples of FIGS. 7(a) and 7(b), that is, a lot of research has been carried out on a signal pattern having a low variation of a signal magnitude and a graph structure for a signal pattern including edges.

In contrast, research has not been carried out on a graph structure for a continuous variation (relatively compared to a smooth signal variation, such as FIG. 7(a), or an edge, such as FIG. 7(c)) that is represented by a plurality of samples and that may be modeled by an analytical function as in the example of FIG. 7(c).

Accordingly, an embodiment of the present invention proposes a method using an unreliable graph edge having weight (i.e., a matrix entry A) close to 0 on both sides of an node indicative of a sample that has the characteristic of a continuous variation in a graph structure for a signal fragment having the characteristic of a continuous variation (e.g., gradient).

Referring to FIG. 7(c), the 1-D signal s_i 710c has the characteristic of a continuous local variation (e.g., gradient) which is present in samples s_1, . . . , s_3.

The graph 720c configured for the 1-D signal s_i includes four nodes (i.e., the entries of a degree matrix) n_i related to respective samples and three edges having weight (i.e., the entry of an adjacent matrix) a_i indicative of a dependency between the fours samples (i.e., nodes).

The graph 720c configured for the 1-D signal s_i is represented by a diagonal degree matrix D and an adjacent matrix A as in Equation 3 below.

$$D = \begin{bmatrix} 1 & 0 & 0 & 0 \\ 0 & 2 & 0 & 0 \\ 0 & 0 & 2 & 0 \\ 0 & 0 & 0 & 1 \end{bmatrix} \quad A = \begin{bmatrix} 1 & 0.01 & 0 & 0 \\ 0.01 & 1 & 0.01 & 0 \\ 0 & 0.01 & 1 & 1 \\ 0 & 0 & 1 & 1 \end{bmatrix} \quad \text{[Equation 3]}$$

A Laplacian matrix L is calculated from the degree matrix D and adjacent matrix A of Equation 3 as in Equation 4 below.

$$L = D - A = \begin{bmatrix} 0 & -0.01 & 0 & 0 \\ -0.01 & 1 & -0.01 & 0 \\ 0 & -0.01 & 1 & -1 \\ 0 & 0 & -1 & 0 \end{bmatrix} \quad \text{[Equation 4]}$$

A continuous variation (e.g., gradient) is present between the sample s_1 and the sample s_2. The graph for the signal pattern may be designed to have a node n_2 having two unreliable graph edges in each of adjacent entries a_1 and a_2 is close to 0 (in the example of FIG. 7(c), 0.01).

In graph-based transform, a graph parameter is reflected to the value of the entry of the matrix A. Accordingly, linear gradient transition is generated over the edge of a basis function U (derived by Equation 2) corresponding to a small eigenvalue (i.e., a low frequency part in the graph spectrum domain).

The results of the basis function U provides a better energy compression characteristic with respect to a signal structure having the characteristic of a continuous signal variation (e.g., gradient).

2) A Set of Graph Parameter Configurations

A graph parameter configuration means a set of parameters necessary to configure a graph. In this specification, a graph parameter configuration may be simply called a graph configuration.

The parameter configuration of a graph G including N nodes {n_i} includes information about an association between an image (and/or video) sample and a node for each node, the number of dependencies (i.e., graph edges) (i.e., the degree of a node) available in a node, and weight of all of graph edges available in a node, but the present invention is not limited thereto.

The association between (i.e., a relation R_i between a sample and node for a node i) between an image (and/or video) sample and a node may be differently defined according to an image (and/or video) or processing block or each node. For example, if one sample is associated with one node, R=1 may be set. If a group of samples (i.e., a plurality of samples) is associated with one node, R≠1 may be set. An indication method of the parameter R is not limited thereto and may be differently represented. For example, an M point signal may be indicated through the number of nodes N.

The degree of a node indicates number of dependencies (i.e., graph edges) in a node n_i and is represented as the entry d_i of a degree matrix.

The character of a dependency which is exploited by a graph structure or which may be exploited between samples of a signal is represented as weight (i.e., an adjacent matrix entry a_i) of a graph edge between a node n_i and a mode n_j (in this case, i≠j).

A graph parameter configuration (or graph configuration) C_i including a set of parameters for generally describing a graph structure for samples or sample group of a given signal may be defined as in Equation 5 below.

$$C_i = \{R_i, d_i, a_i\}$$ [Equation 5]

In Equation 5, i indicates the index of a related node. As described above, R indicates an association between an image (and/or video) sample and a node, d indicates the degree of a node, and "a" indicates weight of each graph edge. "a" may have an array in order to indicate weight for each graph edge. However, in this case, the number of elements included in the array is the same as the degree of a node.

FIG. 8 illustrates graph structures and graph parameter configurations according to embodiments of the present invention.

In the example of FIG. 8, a parameter R is assumed to be R=1 (i.e., an association with one node per one sample) and R has been omitted in a graph parameter configuration, for convenience of description.

In FIG. 8, d specifies the degree of an edge permitted for a current node. An array "a" (i.e., a={w_i}, i=0, ..., d−1) specifies weight of all of edges available in the current node. For example, the array "a" that specifies the weight may start from an edge in a top-vertical direction and specify weight for each edge in a clockwise direction.

However, the sequence for specifying weight as described above is only an example and the present invention is not limited thereto. Furthermore, the weight value of each edge illustrated in FIG. 8 is only an example.

FIG. 8(a) shows an example of a graph configured for a node in which four available dependencies are present in the vertical and horizontal direction and all of the dependencies have strong weight (edge weight=1) (i.e., a={1, 1, 1, 1}). In general, such an example appears in the sample of a 2-D signal within a homogenous image fragment (i.e., the level of a local variation is a low image fragment).

FIG. 8(b) shows an example of a graph configured for a node in which a dependency is not present in the top-vertical direction or a not-utilized dependency (i.e., a={0.1, 1, 1, 1}) is present. In general, such an example appears in a sample located at the border of a processing block.

FIG. 8(c) shows an example of a graph configured for a node in which a dependency is not present in the top-vertical direction and left-horizontal direction or a disabled dependency (i.e., a={0.1, 1, 1, 0.1}) is present. In general, such an example appears in a sample located at the top-left edge of a processing block.

FIG. 8(d) shows an example of a graph configured for a node in which eight available dependencies are present in the diagonal direction in addition to the vertical and horizontal direction and all of the dependencies have strong weight (edge weight=1) (i.e., a={1, 1, 1, 1, 1, 1, 1, 1}).

FIG. 8(e) shows an example of a graph configured for a node in which four available dependencies are present in the vertical and horizontal direction, some dependencies have weak weight (edge weight=0.01) in the vertical-down direction and the remaining dependencies have strong weight (edge weight=1). In general, such an example appears in the sample of a 2-D signal located at the border of an object.

FIG. 8(f) shows an example of a graph configured for a node in which four available dependencies are present in the vertical and horizontal direction, dependencies in the vertical-down and horizontal-right direction have weak weight (edge weight=0.01) and the remaining dependencies have strong weight (edge weight=1). In general, such an example appears in the sample of a 2-D signal located at the bottom-right edge of an object.

FIG. 8 shows only examples illustrating graph parameter configurations and the present invention is not limited thereto. That is, different graph structure not illustrated in FIG. 8 and corresponding graph parameter configurations may be used.

The encoder and the decoder may specify a set of available graph parameter configurations for the processing of a current image and/or video signal (i.e., the encoding/decoding of a current image and/or video signal). For example, the encoder and the decoder may specify a total of six graph parameter configurations as a set of available graph parameter configurations as in the examples of FIG. 8 for the processing of a current image and/or video signal.

In this case, the encoder and the decoder may specify a set of available graph parameter configurations for the entire image and/or video, but may differently specify a set of available graph parameter configurations for each processing block.

In this case, the encoder and the decoder need to specify the same set of available graph parameter configurations for the same image and/or video signal. Accordingly, the encoder and the decoder may specify a set of available graph parameter configurations using the same rule based on the same information (e.g., the type, resolution and size of an image and/or video or an application in which an image and/or video is used).

Alternatively, the encoder may signal information about a set of available graph parameter configurations to the decoder through a bit stream for the processing of a current image and/or video signal.

Alternatively, a set of available graph parameter configurations may be previously fixed regardless of an image and/or video and may be known to both the encoder and the decoder.

3) A Compact Signal Structure Description (or Information)

An embodiment of the present invention proposes a description of a signal structure for a high level structure of a signal which is represented through abstract elements, such as a square block, volume, multi-dimensional polygon or a more complicated figure (e.g., an area or volume depicted by a set of curves).

Such an abstract element is collectively called an object.

The encoder may extract (or derive or determine) a signal structure description (or information) from samples within a processing block. In other words, the encoder may detect one or more objects within a processing block, and may classify samples within the processing block into available graph parameter configurations by taking into consideration the detected object. That is, the encoder may determine a graph parameter configuration applied to a corresponding sample for each sample within the processing block based on the available graph parameter configurations.

Accordingly, the signal structure description (or information) may mean information indicative of a graph parameter configuration applied to each sample within the processing block based on a set of available graph parameter configurations.

More specifically, the encoder detects an object within a current processing block using an object detection algorithm. Furthermore, the encoder classifies samples belonging to an object within the processing block and samples not belonging to an object within the processing block and marks the classified samples. In this case, one or more objects may be present within the processing block. In this case, the encoder may classify samples belonging to a corresponding object for each object and mark the samples. Furthermore, the encoder may classify samples located at the border of an object and mark the samples.

Furthermore, an embodiment of the present invention proposes a method for specifying that which one of preset graph configurations $\{C\_i\}$ is applied to an image/video signal sample within an object that is being processed, that which graph configuration is applied to an image/video signal sample located outside an object that is being processed and/or which graph configuration is applied to an image/video signal sample located at the border of an object (or processing block) that is being processed.

That is, the encoder may determine a graph parameter configuration applied to a corresponding sample for each of samples within a processing block based on an available graph parameter configuration in accordance with a predetermined specification, that is, a mapping relationship (or mapping rule) between an image/video signal sample within a processing block and the graph parameter configuration.

FIG. 9 illustrates a method for defining a graph configuration for the processing of a video signal according to an embodiment of the present invention.

FIG. 9 shows an example in which the sample of a 2-D signal is indicated by a circle and the size of a block 910 that is processed is 6×6. It is assumed that the 2-D signal within the block 910 that is being processed and that has the 6×6 size includes an object 920 and other objects (e.g., a background represented by the remaining samples).

The sample of a 2-D image/video signal is classified in relation to a graph configuration $\{C\_i\}$. FIG. 9 illustrates the 2-D signal sample classified as the graph configuration set $\{C\_i\}$ illustrated in FIG. 8, for convenience of description, but the present invention is not limited to the example.

The encoder may detect the object 920 within the processing block 910 using an object detection algorithm.

Furthermore, the encoder may derive a signal structure description (or information) from samples within the processing block 910. That is, the encoder may determine a graph configuration applied to a corresponding sample depending on whether the sample within the processing block 910 is located inside the object 920 or located outside the object 920, or depending on whether the sample within the processing block 910 is located at the border of the processing block 910 (i.e., a border between the processing block 910 and another processing block and/or a border between the processing block 910 and the object 920 within the processing block 910).

FIG. 9 illustrates an example in which only one object 920 is included in the processing block 910, for convenience of description, but the present invention is not limited thereto. A plurality of objects may be included in the processing block 910. If a plurality of objects is included in the processing block 910, the encoder may classify samples within the plurality of objects for each object and determine a graph configuration.

FIG. 9 illustrates an example in which a category classified according to each sample is labeled with a low case letter.

A sample having a category "a" is not located at the border of the processing block 910 and/or the object 920 and has the characteristics of dependencies in the horizontal and vertical directions. The sample may be processed as (i.e., determined to be) the graph configuration illustrated in FIG. 8(a).

A sample having a category "b" and a sample having a category "e" are located at the borders of the processing block and may be processed as (i.e., determined to be) the graph configurations illustrated in FIGS. 8(b) and 8(e). That is, as illustrated in FIGS. 8(b) and 8(e), a dependency in the vertical direction is not present or a dependency has been intentionally neglected (i.e., a dependency is disabled) in the graph design.

Samples having categories "c" and "f" are located at the edges of the processing block 910 and/or the object 920 and may be processed as (i.e., determined to be) the graph configurations illustrated in FIGS. 8(c) and 8(f).

If the object 920 is present inside the processing block 910 as described above, samples adjacent to the border of the object 920 (i.e., samples that are adjacent to the border of the object 920 among samples not belonging to the object 920 and samples that are adjacent to the border of the object 920 among samples belonging to the object 9201 and) may be set so that they do not have a dependency. That is, a graph configuration may be determined so that samples adjacent to the border of the object 920 are not connected by an edge.

In FIG. 9, a 2-D sample not indicated by a label indicates a sample that has not been classified as the category of the graph configuration $\{C\_i\}$, but this is only an example. Such a sample may also be classified as a graph configuration available in the graph configuration $\{C\_i\}$ provided by FIG. 8 or may be classified as an extended set $\{C\_i\}$ having an additional configuration (e.g., a configuration in which a restrictive dependency has been applied in the horizontal direction).

As shown in FIG. 9, the encoder detects the object 920 within the processing block 910 using an object detection algorithm, and determines a graph configuration to be applied to a corresponding sample for each sample by taking into consideration the detected object 920. That is, the encoder may determine a graph parameter configuration applied to a corresponding sample for each sample by taking into consideration whether a sample within the processing block 910 belongs to the object 920 or not, whether a sample within the processing block 910 is located at the border of the processing block 910 and/or the object 920 or not, whether a sample within the processing block 910 is located at the edge of the processing block 910 and/or the object 920 and so on. The encoder may determine a graph configuration to be applied to all of the samples within the processing block 910 as described above, but may determine a graph configuration to be applied to only some samples.

In an embodiment of the present invention, a signal structure description may be interpreted as a specification differently defined according to an application or use case. That is, a mapping relationship between an image/video signal sample within a processing block and a graph parameter configuration may be differently determined depending on an application or use case. This is described below with reference to FIGS. 10 and 11.

FIG. 10 illustrates graph configurations for the block of a video signal according to embodiments of the present invention.

In an embodiment of the present invention, a specification may be defined so that samples located at the border of a processing fragment (i.e., image block) are interpreted as unavailable nodes or nodes having a limited dependency as in FIG. 10(a).

Referring to FIG. 10(a), a graph configuration may be determined so that nodes related to a sample located at the border of a processing block have a smaller number of edges compared to samples within the processing block other than the border of the processing block. For example, samples 1011 located at the top border of the processing block may be determined to be represent in a graph with the graph configuration "b" (refer to FIG. 8). As described above, a graph configuration is determined so that a sample located at the border of the processing block has a smaller number of edges compared to a graph so that the sample has a smaller number of edges than a sample located within the processing block other than the border of the processing block. Accordingly, the samples may be substituted with nodes that preserve a common 2-D signal layout.

Furthermore, FIG. 10(a) illustrates only the processing block, but samples located at the border of the object 920 within the processing block 910 may be identically applied as in the example of FIG. 9. A graph configuration may be determined so that a sample located at the border of the object 920 has a smaller number of edges than a sample located within the object 920 other than the border of the object 920 (or samples located within the processing block 910 other than the border of the processing block 910) (i.e., the samples classified as the graph configurations "b" and "e" in the example of FIG. 9).

In another embodiment of the present invention, a specification may be defined so that a circular dependency is established between samples located at different surfaces of a processing block. A graph including circular edges that has been introduced for a node associated with samples located at the vertical border of a processing block is illustrated in FIG. 10(b).

Referring to FIG. 10(b), a graph configuration may be determined so that a node 1021/1022 related to samples located at the vertical border of a processing block has circular edges with respect to the node 1022/1021 related to samples located at the vertical border on the opposite side of the block.

Furthermore, FIG. 10(b) illustrates only the processing block, but samples located at the vertical border of an object present within the processing block may also be identically applied. That is, a graph configuration may be determined so that samples located at the vertical border of the object have circular edges with respect to samples located at the vertical border on the opposite side.

In yet another embodiment of the present invention, a graph structure may be interpreted so that a specific signal structure prevents a dependency (i.e., edge) available in a node. That is, a graph configuration may be determined so that a dependency (i.e., edge) is prevented in a specific node within a processing block.

In yet another embodiment of the present invention, the same signal structure may be interpreted so that a dependency (i.e., edge) available in a node is preserved, but the source of the dependency is changed into a new direction (i.e., redefine another node connected in a corresponding node). That is, a graph configuration may be determined so that a dependency (i.e., edge) is prevented in a specific node within a processing block, but a node connected in a corresponding node is changed.

FIG. 11 illustrates two types of such use examples.

FIG. 11 illustrates graph configurations for the block of a video signal according to embodiments of the present invention.

FIG. 11 illustrates a processing block of a 6×6 size, such as that of FIG. 9.

FIG. 11(a) illustrates information about a signal structure in which a dependency between samples 1111a and 1112a that belong to samples within a processing block and that are located on the side opposite an object 1120 is prevented from being established.

The encoder can prevent a dependency between the samples 1111a and 1112a (i.e., samples A other than the object 1120) belonging to a background because the object 1120 within the processing block (i.e., samples B forming a block of a 2×3 size) is present within the processing block as shown in FIG. 11(a). That is, the encoder may determine the graph configuration of the corresponding samples 1111a and 1112a so that the samples 1111a and 1112a that belong to samples not belonging to the object 1120 and that are adjacent to the object 1120 are not connected by an edge.

For example, the samples 1111a adjacent to the top border of the object 1120 may be determined to be the graph configuration illustrated in FIG. 8(e). The samples 1112b adjacent to the bottom border of the object 1120 may be determined to be the graph configuration illustrated in FIG. 8(b).

FIG. 11(b) illustrates information about a signal structure which is interpreted so that a dependency between samples located on the other side of an object is not interrupted. That is, FIG. 11(b) shows an example in which the presence of an object not prevents the establishment of a dependency (i.e., edge).

Although the object 1120 is present in the processing block as shown in FIG. 11(b), the encoder may maintain a dependency between the samples 1111b and 1112b belonging to a background. That is, the encoder may determine the graph configuration of the samples 1111b and 1112b so that the samples 1111b and 1112b adjacent to the object 1120 are connected by edges. For example, the samples 1111b and 1112b adjacent to the object 1120 may be determined to be the graph configuration illustrated in FIG. 8(a).

FIG. 11 illustrates a dependency between samples located at the top border and bottom border of an object, for convenience of description, but the present invention is not limited thereto.

In the two cases, it has been described that in an available signal structure, an object is present within a processing block. The graph structure of samples not belonging to an object may be differently configured as in the examples of FIG. 11.

4) The Reflection of a Signal Structure into a Mathematical Graph Description

If the description of a signal structure and an available graph configuration {C_i} are specified, a graph is configured from the elements of the available graph configuration {C_i} using an established specification.

A graph configured as described above may be represented by the degree matrix D and the adjacent matrix A. As a result, the graph may be mathematically described through the Laplacian matrix L. The Laplacian matrix L is used to derive the optimal transform U in accordance with Equation 2.

The diagonal entry D_i,j of the degree matrix D indicative of the complexity of a dependency on each node is equal to the summation of the i-th rows of the adjacent matrix A (i.e., the number of entries of an i-th row other than 0).

An embodiment of the present invention proposes a method for modifying the degree matrix D by applying an offset to the entry value of a graph node related to signal samples that belongs to the same region based on the compact description of a signal structure. This is described below with reference to FIG. 12.

FIG. 12 is a diagram for illustrating a method for deriving transform depending on a variation pattern of a video signal according to an embodiment of the present invention.

FIG. 12 illustrates the four points of a signal s_i that form two different variation patterns, that is, a class 1 and a class 2.

FIG. 12 shows an example in which the 1-D signal "s_i" of the 4 points includes low magnitude samples at locations 1 and 4 and includes high magnitude samples at locations 2 and 3.

In order to specify the signal samples formed of the 2 classes, a signal structure description may be used. FIG. 12 shows an example in which {s_1, s_4} samples belong to the class 1 and {s_2, s_3} samples belong to the class 2.

In the graph structure of the signal "s_i", the degree matrix D and the adjacent matrix A may be derived as in Equation 6 below.

$$D = \begin{bmatrix} 2 & 0 & 0 & 0 \\ 0 & 2 & 0 & 0 \\ 0 & 0 & 2 & 0 \\ 0 & 0 & 0 & 2 \end{bmatrix} \quad A = \begin{bmatrix} 1 & 0.1 & 0 & 0 \\ 0.1 & 1 & 1 & 0 \\ 0 & 1 & 1 & 0.1 \\ 0 & 0 & 0.1 & 1 \end{bmatrix} \quad \text{[Equation 6]}$$

In Equation 6, weight 0.1 (weights=0.1) indicates a low correlation between samples located at the border of the two classes (i.e., between the first sample and the second sample and between the third sample and the fourth sample).

In a method proposed by the present invention, samples 1 and 4 may be classified as one class (i.e., the class 1) using signal structure information. The degree matrix D may be modified based on the face that a signal is classified into a plurality of classes. In accordance with a method proposed by the present invention, the degree matrix D and the adjacent matrix A may be derived from the signal illustrated in FIG. 12 as in Equation 7.

$$D = \begin{bmatrix} P+2 & 0 & 0 & 0 \\ 0 & 2 & 0 & 0 \\ 0 & 0 & 2 & 0 \\ 0 & 0 & 0 & P+2 \end{bmatrix} \quad \text{[Equation 7]}$$

$$A = \begin{bmatrix} 1 & 0.1 & 0 & 0 \\ 0.1 & 1 & 1 & 0 \\ 0 & 1 & 1 & 0.1 \\ 0 & 0 & 0.1 & 1 \end{bmatrix}$$

In Equation 7, P is a randomly selected value. A value much greater than the number of degrees available in a node within a current graph G may be selected as the randomly selected value.

Furthermore, such information may be directly introduced into the Laplacian matrix L as in Equation 8 below using Equation 1.

$$L = \begin{bmatrix} P+1 & -0.1 & 0 & 0 \\ -0.1 & 1 & -1 & 0 \\ 0 & -1 & 1 & -0.1 \\ 0 & 0 & -0.1 & P+1 \end{bmatrix} \quad \text{[Equation 8]}$$

In Equation 2, in the process of deriving the transform U, to configure a set of the result value of eigenvector decomposition and an orthogonal basis function is influenced by clearly separating the sample of the class 1 and the sample of the class 2, that is, the classes of a given signal, by applying an offset P to the Laplacian matrix.

That is, a different offset may be applied to the entry of the matrix D for each class of the signal. In this case, samples within a processing block may be classified into a plurality of signal classes based on the description of a signal structure. In other words, samples within a processing block may be classified into a plurality of signal classes based on a graph configuration determined for each sample. For example, samples within a processing block may be classified into a plurality of signal classes by grouping the samples into contiguous samples having a high dependency. For another example, if an object is not present in a processing block, samples within a processing block may be classified into samples belonging to the object and samples not belonging to the object.

FIG. 12 illustrates an example in which a signal is divided into two classes, for convenience of description, but the present invention is not limited thereto. That is, a signal may be classified into three or more classes using a graph structure description and each of the classes may be independently processed (i.e., by independently applying an offset) in order to improve efficiency of signal processing.

For the purpose of signal processing and/or enhancement, that is, one of the objects of the present invention, a graph-based processing technology may be used as an embodiment of the present invention. Such an embodiment may include transform-based signal filtering, denoising and enhancement. Transform used in this case may be derived from the signal structure description proposed by the present invention and a graph configured using the graph structure.

Furthermore, for the purpose of signal compression, that is, one of the objects of the present invention, a graph-based processing technology may be used as an embodiment of the present invention. Such an embodiment includes transform-based signal compression. Transform used in this case may be derived from the signal structure description proposed by the present invention and a graph configured using the graph structure.

In an embodiment of the present invention, a signal structure description and an available graph configuration may be derived from a signal that is being processed using detection, segmentation and/or a morphological operation.

In an embodiment of the present invention, a signal structure description and an available graph configuration used in graph-based processing may be signaled from the encoder to the decoder within a compact bit stream.

FIG. 13 is a diagram illustrating a method for processing a video signal using graph-based transform according to an embodiment of the present invention.

Referring to FIG. 13, the encoder may specify a set of available graph configurations for the processing (e.g., encoding or filtering) of a current image/video signal (S1301).

In this case, the encoder may specify a set of available graph parameter configurations using information, such as the type, resolution or size of an image and/or video or an application in which an image and/or video is used.

Furthermore, the encoder may specify the set of available graph parameter configurations for the entire image and/or video, but may specify the set of available graph parameter configurations for each processing block of a preset N×N size.

Furthermore, the encoder may signal (or send) information about the set of available graph parameter configurations to the decoder through a bit stream.

In contrast, the set of available graph parameter configurations may be previously fixed regardless of an image and/or video and may be known to both the encoder and the decoder. In this case, step S1301 may be omitted.

Although not shown in FIG. 13, prior to step S1301, an image/video 2-D signal that is being processed may be partitioned into processing blocks (PBs) and processed in a processing block unit (e.g., inter-prediction or intra-prediction).

The encoder extracts (or derives) signal structure information from samples within the processing block (S1303).

The encoder may determine a graph parameter configuration applied to a corresponding sample for each sample by taking into consideration an object within the processing block based on the available graph parameter configurations. That is, the signal structure information may be defined as information about a graph configuration that belongs to the set of specified graph configurations and that is applied to each of the samples within the processing block.

In this case, the graph configuration may be determined depending on whether samples belong to a detected object within the processing block or not, or depending on whether samples are located at the border of the object or not.

Furthermore, the graph configuration may be determined so that a sample located at the border of the processing block has a smaller number of edges than other samples.

Furthermore, the graph configuration may be determined so that samples located at the vertical border of the processing block have circular edges along with samples located at another vertical border of the processing block on the opposite side.

Furthermore, the graph configuration may be determined so that samples adjacent to the object do not have an edge with respect to samples adjacent to the other side of the object.

Furthermore, the graph configuration may be determined so that samples adjacent to the object have edges with samples adjacent to the other side of the object.

Step S1303 is described in more detail below with reference to FIG. 14.

FIG. 14 is a diagram illustrating a method for processing a video signal using graph-based transform according to an embodiment of the present invention.

Referring to FIG. 14, the encoder detects one or more objects included in a processing block using an object detection algorithm (S1401).

The encoder classifies samples included in the one or more objects into samples belonging to an object within the processing block and samples not belonging to the object (S1402).

In this case, the encoder may classify the samples belonging to the object within the processing block and the samples not belonging to the object, and mark them.

In this case, one or more objects may be present within the processing block. In this case, the encoder may classify samples belonging to a corresponding object for each object and mark them.

Referring back to step S1302, as in steps S1401 and S1402, the encoder may classify whether samples within the processing block belong to an object, and may derive (or extract) information about the signal structure information (or description) of the processing block based on a predetermined specification (i.e., a mapping relationship between an image/video signal sample within the processing block and a graph parameter configuration). That is, the encoder may determine a graph parameter configuration applied to a corresponding sample for each of samples within the processing block.

In this case, the mapping relationship between an image/video signal sample within the processing block and the graph parameter configuration may be differently determined depending on an application or use case as described with reference to the examples of FIGS. 10 and 11.

The encoder configures a graph for the samples within the processing block using the signal structure information (S1303).

That is, the encoder may configure the graph for the processing block by applying a graph configuration determined for each sample within the processing block.

The encoder determines transform U for the processing block using the graph (S1304).

As described above, the graph may be represented by the degree matrix D and the adjacent matrix A. As a result, the graph may be represented through the Laplacian matrix L. Furthermore, the Laplacian matrix L is used to derive optimal transform U in accordance with Equation 2.

In this case, as described above, the encoder may classify the samples within the processing block into a plurality of classes based on the description of the signal structure, that is, a graph configuration determined for each sample within the processing block. Furthermore, the encoder may independently apply an offset value to the entry of the degree matrix D for each class of a signal class (or the class of a sample).

The encoder performs transform processing on the samples within the processing block using the determined transform U (S1305).

Thereafter, the encoder may perform a filtering operation on the spectrum of the transform U (S1311).

Furthermore, the encoder may quantize the transform coefficient of the transform U, may entropy-code the quantized transform coefficient, and may output the entropy-coded coefficient as a bit stream (S1321).

In this case, the bit stream may include information about a signal structure for a current processing block (i.e., information about a graph configuration for each sample).

FIG. 15 is a detailed diagram illustrating a transform unit which performs graph-based transform according to an embodiment of the present invention.

Referring to FIG. 15, the transform unit 120 (refer to FIG. 1) implements the function, process and/or method proposed in 1) to 4) of the present invention. More specifically, the transform unit 120 may be configured to include a graph configuration set specification unit 1501, a signal structure derivation unit 1502, a graph configuration unit 1503, a transform determination unit 1504 and a transform processing unit 1505.

The graph configuration set specification unit 1501 specifies a set of available graph configurations for the processing of a current image/video signal (e.g., encoding or filtering).

Alternatively, the set of available graph parameter configurations may be previously fixed regardless of an image and/or video and may be known to both the encoder and the decoder. In this case, the graph configuration set specification unit 1501 may be omitted.

The signal structure derivation unit 1502 derives (or extracts signal structure information (or description) from samples within a processing block. That is, the signal structure derivation unit 1502 may determine a graph parameter configuration applied to a corresponding sample for each sample by taking into consideration an object within the processing block based on an available graph parameter configuration.

The graph configuration unit 1503 configures a graph for the samples within the processing block using the signal structure information. That is, the graph configuration unit 1503 may configure the graph for the processing block by applying the graph configuration determined for each of the samples within the processing block.

The transform determination unit 1504 determines transform U for the processing block using the graph. That is, the transform determination unit 1504 may represent the graph using a degree matrix D and an adjacent matrix A, and may derive a Laplacian matrix L as in Equation 1 using the degree matrix D and the adjacent matrix A. Furthermore, the transform determination unit 1504 may derive optimal transform U using the Laplacian matrix L as in Equation 2.

In this case, as described above, the transform determination unit 1504 may classify the samples within the processing block into a plurality of classes based on the description of the signal structure, and may independently apply an offset value to the entry of the degree matrix D for each class of a signal (or the class of a sample).

The transform processing unit 1505 performs transform processing on the samples within the processing block using the determined transform U.

FIG. 16 is a diagram illustrating a method for processing a video signal using graph-based transform according to an embodiment of the present invention.

Referring to FIG. 16, the decoder may specify a set of available graph configurations for the processing (e.g., encoding or filtering) of a current image/video signal (S1601).

In this case, the decoder may specify the set of available graph parameter configurations using information, such as the type, resolution or size of an image and/or video or an application in which an image and/or video is used.

Furthermore, the decoder may specify the set of available graph parameter configurations for the entire image and/or video, but may specify the set of available graph parameter configurations for each processing block of a preset N×N size.

Furthermore, the decoder may receive information about the set of available graph parameter configurations from the encoder through a bit stream.

In contrast, the set of available graph parameter configurations may be previously fixed regardless of an image and/or video and may be known to both the encoder and the decoder. In this case, step S1601 may be omitted.

The decoder determines (or derives) information about a signal structure for samples within a processing block from the bit stream (S1602). As described above, the bit stream signaled by the encoder may include information about a signal structure for a current processing block (i.e., information about a graph configuration applied to each of samples within the current processing block).

The decoder configures a graph for the samples within the processing block using the signal structure information (S1603).

That is, the decoder may configure the graph for the processing block by applying a determined graph configuration to each of the samples within the processing block.

The decoder determines transform U for the processing block using the graph (S1604).

The decoder determines (or derives) a transform coefficient from the bit stream and performs inverse transform processing on the determined transform coefficient (S1605).

The decoder may obtain a residual signal by inverse transforming the transform coefficient and may generate a reconstructed signal by adding the obtained residual signal to a prediction signal.

Although not shown in FIG. 16, the decoder may inverse quantize the transform coefficient determined from the bit stream prior to step S1605.

FIG. 17 is a detailed diagram illustrating the inverse transform unit which performs graph-based transform according to an embodiment of the present invention.

Referring to FIG. 17, the inverse transform unit 230 (refer to FIG. 2) implements the function, process and/or method proposed in 1) to 4) of the present invention. More specifically, the inverse transform unit 230 may be configured to include a graph configuration set specification unit 1701, a signal structure determination unit 1702, a graph configuration unit 1703, a transform determination unit 1704 and an inverse transform processing unit 1705.

The graph configuration set specification unit 1701 specifies a set of available graph configurations for the processing (e.g., encoding or filtering) of a current image/video signal.

Alternatively, the set of available graph parameter configurations may be previously fixed regardless of an image and/or video and may be known to both the encoder and the decoder. In this case, the graph configuration set specification unit 1701 may be omitted.

The signal structure determination unit 170 determines (or derives) information about a signal structure for samples within a processing block from a bit stream.

the graph configuration unit 1703 configures a graph for the samples within the processing block using the signal structure information. That is, the graph configuration unit 1703 may configure the graph for the processing block by applying a graph configuration determined for each of the samples within the processing block.

The transform determination unit 1704 determines transform U for the processing block using the graph.

The inverse transform processing unit 1705 determines (or derives) a transform coefficient from the bit stream and performs inverse transform processing on the determined transform coefficient.

In the aforementioned embodiments, the elements and characteristics of the present invention have been combined in specific forms. Each of the elements or characteristics may be considered to be optional unless otherwise described explicitly. Each of the elements or characteristics may be implemented in such a way as to be not combined with other elements or characteristics. Furthermore, some of the elements and/or the characteristics may be combined to form an embodiment of the present invention. The order of the operations described in connection with the embodiments of the present invention may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

An embodiment of the present invention may be implemented by various means, for example, hardware, firmware, software or a combination of them. In the case of implementations by hardware, an embodiment of the present invention may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers and/or microprocessors.

In the case of an implementation by firmware or software, an embodiment of the present invention may be implemented in the form of a module, procedure, or function for performing the aforementioned functions or operations. Software code may be stored in memory and driven by a processor. The memory may be located inside or outside the processor, and may exchange data with the processor through a variety of known means.

It is evident to those skilled in the art that the present invention may be materialized in other specific forms without departing from the essential characteristics of the present invention. Accordingly, the detailed description should not be construed as being limitative from all aspects, but should be construed as being illustrative. The scope of the present invention should be determined by reasonable analysis of the attached claims, and all changes within the equivalent range of the present invention are included in the scope of the present invention.

INDUSTRIAL APPLICABILITY

The aforementioned embodiment of the present invention has been disclosed for an illustrative purpose, and those skilled in the art may modify, change, substitute or add various other embodiments within the technical spirit and range of the present invention disclosed in the claims.

The invention claimed is:

1. A method for processing a video signal using graph-based transform, the method comprising:
   specifying a set of available graph configurations in order to process the video signal;
   extracting signal structure information representing information for a graph configuration which is applied to each sample in a processing block, from samples within the processing block of the video signal,
   wherein the graph configuration belongs to the specified set of graph configurations;
   configuring a graph for the samples within the processing block using the signal structure information;
   determining transform for the processing block using the graph; and
   transforming the samples within the processing block using the transform,
   wherein the graph configuration is determined depending on whether the sample belongs to a detected object within the processing block or not, or depending on whether the sample is located at a border of the object or not,
   wherein the graph configuration is determined so that a sample located at a border of the processing block has a smaller number of edges than other samples,
   wherein the samples within the processing block are classified into a plurality of signal classes based on the signal structure information, and
   wherein an offset value is independently applied to a degree matrix of the graph for each of the plurality of signal classes.

2. The method of claim 1, wherein the graph configuration is determined so that a sample located at a vertical border of the processing block has a circular edge along with a sample located at another vertical border on a side opposite the processing block.

3. The method of claim 1, wherein the graph configuration is determined so that a sample adjacent to an object does not have an edge along with a sample adjacent to the other side of the object.

4. The method of claim 1, wherein the graph configuration is determined so that a sample adjacent to an object has an edge along with a sample adjacent to the other side of the object.

5. The method of claim 1, wherein the graph configuration comprises information about an association between a sample and a node within the processing block, information about a number of edges available in the node, and weight for all of edges available in the node.

6. A method for processing a video signal using graph-based transform, the method comprising:
   specifying a set of available graph configurations in order to process the video signal;
   determining signal structure information representing information for a graph configuration which is applied to each sample in a processing block from a bit stream of the video signal,
   wherein the graph configuration belongs to the specified set of graph configurations;
   configuring a graph for samples within a processing block of the video signal using the signal structure information;
   determining transform for the processing block using the graph; and
   inverse transforming a transform coefficient determined from the bit stream,
   wherein the graph configuration is determined depending on whether the sample belongs to a detected object within the processing block or not, or depending on whether the sample is located at a border of the object or not,
   wherein the graph configuration is determined so that a sample located at a border of the processing block has a smaller number of edges than other samples, wherein the samples within the processing block are classified into a plurality of signal classes based on the signal structure information, and wherein an offset value is independently applied to a degree matrix of the graph for each of the plurality of signal classes.

7. The method of claim 6, wherein the graph configuration comprises information about an association between a sample and a node within the processing block, information about a number of edges available in the node, and weight for all of edges available in the node.

* * * * *